United States Patent Office 3,482,163
Patented Dec. 2, 1969

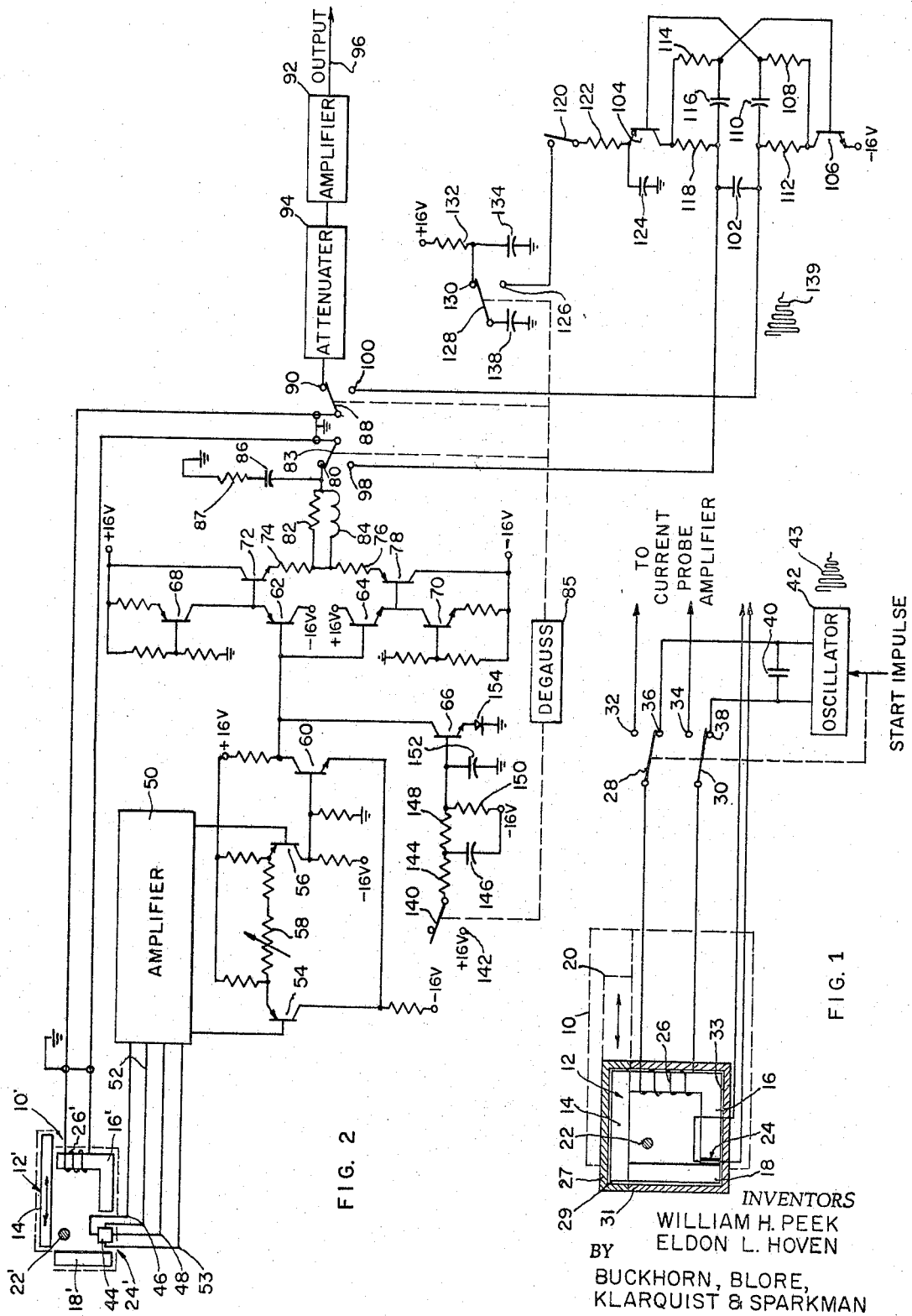

3,482,163
MAGNETIC SIGNAL MEASURING DEVICE INCLUDING DEGAUSSING MEANS
William Henderson Peek, Beaverton, Eldon Lee Hoven, Portland, Oreg., assignors to Tektronix, Inc., Beaverton, Oreg., a corporation of Oregon
Filed May 24, 1967, Ser. No. 640,933
Int. Cl. G01r 33/06
U.S. Cl. 324—117                                11 Claims

ABSTRACT OF THE DISCLOSURE

A degaussing circuit for a current measuring probe. The probe is provided with a secondary winding and a Hall device effective for measuring low frequency and direct currents. The Hall device is normally connected in energizing relationship to the secondary winding but switching means selectively connects the secondary winding to an oscillator circuit for degaussing the probe's magnetic core.

CROSS REFERENCES TO RELATED APPLICATIONS

The present invention is related to the co-pending application of Willem B. Velsink, Ser. No. 570,810, entitled "Magnetic Field Measuring Method and Device," filed Aug. 8, 1966, and assigned to the assignee of the present invention.

BACKGROUND OF THE INVENTION

In the above referred to application of Willem B. Velsink, a current measuring probe is set forth and claimed for producing an output proportional to current in a conductor over a wide frequency range. A probe of this type includes a magnetic core linked by such conductor and a first means responsive to the steady value of flux surrounding such conductor as well as being responsive to low frequency alternating current components thereof. This means may comprise a Hall device inserted across the cross-section of the probe's magnetic core for intercepting the magnetic flux in such core. The current output of the Hall device, which is a measure of direct and low frequency currents in the conductor, is amplified and applied to a secondary winding provided on the probe's core in a direction for opposing the flux responsible for the Hall current.

A voltage is also induced in the aforementioned winding by magnetic flux in the core, particularly in the case of higher frequency alternating currents flowing in the conductor. The combined current in the secondary winding is therefore representative of the current in the input conductor over a wide frequency range from high frequencies down to zero frequency.

Since the current probe of the above described type is thus responsive, not only to alternating components of input current, but also to direct components thereof, it is important that the current probe's core not be subject to extraneous values of magnetic flux. External magnetic fields, e.g. the earth's magnetic field and other stray fields associated with electrical equipment, may tend to permanently magnetize the probe's core and give rise to erroneous output indications from the probe. It is therefore desired that means be provided for effectively and conveniently degaussing the magnetic core.

SUMMARY OF THE INVENTION

In accordance with the present invention, means are provided which selectively connect the aforementioned secondary winding on the probe's core into a tuned circuit adapted to produce damped oscillations for degaussing of the magnetic core. In accordance with a specific embodiment, switching means disconnect the secondary winding from means for receiving the Hall current as well as from means for measuring the current in such winding. This switching means then connects the secondary winding across a capacitor completing a tuned circuit. The tuned circuit is part of an oscillator powered by power supply capacitor energizing the tuned circuit during a discharge period of such power supply capacitor. A damped oscillation is produced in the tuned circuit, including the aforementioned secondary winding, and the corresponding flux acts to degauss the probe's magnetic core. Degaussing is easily and quickly accomplished without employing a bulky external degausser coil and a power supply therefor.

The subject matter we regard as our invention is particularly pointed out and distinctly claimed in the concluding portion of this specification. The invention itself, however, both as to organization and method of operation, together with further advantages and objects thereof, may best be understood by reference to the following description taken in connection with the accompanying drawings wherein like reference characters refer to like elements.

DRAWINGS

FIG. 1 is a simplified schematic diagram of current probe and degaussing means according to the present invention.

FIG. 2 is a schematic diagram of a particular circuit according to the present invention.

DETAILED DESCRIPTION

In FIG. 1, a measuring probe having a body generally indicated by dashed lines at 10 includes at its forward end a magnetic core 12 having an upper movable portion 14 and a lower fixed portion, the latter comprising an L-shaped section 16 and an I-shaped section 18. The I-shaped section 18 is suitably located at the front of the probe and disposed vertically, with L-shaped section 16 located adjacent thereto so as to form a U-shaped fixed core portion.

Movable core portion 14 is slidable with respect to the fixed portion and may be moved longitudinally with respect to probe 10 into a recess 20. When portion 14 is in such retracted position within recess 20, a conductor 22 may be inserted within the U-shaped lower portion, and then movable portion 14 is withdrawn from recess 20 and positioned in abutting relation to the lower U-shaped core portion so as to complete a substantially closed magnetic circuit around conductor 22, as shown. Conductor 22 is the conductor in which current is to be measured.

Both the movable and fixed portions of magnetic core 12 are formed of magnetic material and preferably ferrite material. The major part of at least the fixed core portion is desirably formed of high permeability ferrite. However, between I-shaped section 18 and L-shaped section 16 there is located a Hall device 24 conveniently comprising cross-sectional layers of high resistance ferrite or insulating material, e.g. silicon monoxide, and a semiconductive Hall plate therebetween, suitably evaporated onto one of the high resistance layers. This Hall device is employed for measuring the direct and low frequency components of current flowing in conductor 22 and is constructed and employed in the manner set forth and claimed in the aforementioned copending application of Willem B. Velsink, Ser. No. 570,810.

Also disposed upon the magnetic coil is a secondary winding or output coil 26 suitably wound around L-shaped section 16 of the core. This coil is connected to the movable contacts 28 and 30 of a double pole-double throw switch having corresponding fixed contacts 32 and 34 for connecting the coil to a current probe amplifier. in this amplifier alternating currents, as may be induced in coil 26, are amplified. Also direct currents as derived from Hall device 24 are supplied to coil 26 in a sense opposing the magnetic field produced by current in conductor 22. These currents are also amplified in the current probe amplifier. In a second position of movable contacts 28 and 30, these movable contacts connect to fixed contacts 36 and 38 respectively. In this position of the switch, the coil 26 is connected across the tuned circuit capacitance 40 which, together with coil 26, forms the tuned circuit for oscillator 42.

The core 12 is also suitably shielded by means of a magnetic shield having a movable portion 27 joined to movable core portion 14 while being insulated therefrom with an insulating layer 29, and a magnetic shield fixed portion 31 joined to the fixed core portion while also being insulated therefrom by means of insulating layer 33. The shield is also formed of magnetic material.

During operation of the FIG. 1 probe, the movable portion 14 of the core 12 is withdrawn within recess 20 of probe 10, and a conductor 22, in which the current is to be measured, is inserted within the lower portion of the core. The upper portion 12 is now slid over the lower portion and the conductor for completing a magnetic circuit around the conductor. It is understood that a magnetic flux will be induced in core 12 corresponding to the current flowing in conductor 22. At least the low frequency and direct components of this flux will be measured by Hall device 24. Higher frequency components of the flux may be measured by means of coil 26.

Coil 26 also performs two other functions. First, a DC current is caused to flow therein corresponding to the current provided by the Hall device (by means of circuitry not shown in FIG. 1). Secondly, the coil is used for degaussing the magnetic circuit comprising core 12 so that erroneous permanent magnetization does not affect the measurement accuracy of the probe, particularly with respect to direct currents flowing in conductor 22. When switch contacts 28 and 30 are thrown to the lower position, the coil 26 is disconnected from the current probe amplifier, as well as circuitry connected therewith for coupling the output of the Hall device 24 to coil 26. With the switch thrown to the lower position, coil 26 is coupled across capacitor 40, thereby completing a parallel tuned circuit including coil 26 and capacitor 40. This tuned circuit comprises the tuned circuit for oscillator 42 which is caused to start oscillation by the application of an oscillator start impulse provided coincident with the connection of switch contacts 28 and 30 with contacts 36 and 38. For example, the oscillator is switched on at the same time the switch contacts are operated.

The oscillator 42, including the aforementioned tuned circuit, is adapted to provide a damped wave oscillation current in coil 26 as indicated by waveform 43 on the diagram. The tuned resonant circuit circulating current flowing through coil 26 is designed to have sufficient amplitude for providing alternate positive and negative saturation of core 12, at least during the start or higher magnitude portion of such damped oscillation. The core 12 is thereby effectively degaussed. The saturation of the core first by magnetic flux directed in one direction and then by magnetic flux directed in the opposite direction essentially overrides any residual magnetism present in the core. Then, as the damped wave oscillations diminish in magnitude, the core magnetization executes successively smaller hysteresis loops until all residual magnetization is substantially removed. In a particular example, the frequency of the damped wave provided by the tuned circuit comprising coil 26 and capacitor 40 was between approximately 10 and 15 kilocycles per second.

Referring to FIG. 2, illustrating a specific circuit in accordance with the present invention, a probe 10', which is illustrated schematically, includes elements designated by primed reference numerals referring to similarly numbered elements in the FIG. 1 embodiment. The Hall device 24' is shown at 90 degrees from its true position so that the connections to the Hall device may be more easily illustrated. The Hall device comprises a semi-conductive Hall plate 44 disposed such that substantially all the flux in core 12' passes therethrough. First connections 46 and 48 couple the output of the Hall plate to a high gain DC differential amplifier 50. Second connections from the amplifier, numbered 52 and 53, provided a direct current to points on the Hall plate located in a line substantially orthogonal to the line between points where connections 46 and 48 are made. The Hall current from connections 46 and 48 is a measure of the flux in core 12', particularly for a substantially constant or unchanging magnetic field.

The output of amplifier 50 is coupled as the input to a paraphase DC amplifier comprising transistors 54 and 56, wherein the respective base electrodes of these transistors receive the DC output of amplifier 50. The emitters of the transistors 54 and 56 are coupled together by a resistance including variable resistor 58, by means of which the gain of the amplifier may be adjusted. Outputs of the paraphase amplifier, taken from the collector electrodes of transistors 54 and 56, are applied to the base and emitter of transistor 60, the collector of the latter being connected to the base electrodes of transistors 62 and 64 as well as the collector electrode of transistor 66. The emitter electrode of transistor 62 is coupled to a positive voltage through current source transistor 68, and the emitter of transistor 64 is similarly connected to negative voltage through current source transistor 70. The emitter of transistor 62 drives the base of transistor 72 having its emitter electrode connected through a thermal stabilizing resistor 74 to a similar thermal stabilizing resistor 76 for transistor 78, the base of the latter being driven by the emitter of transistor 64. The midpoint between thermal stabilizing resistors 74 and 76 is connected to fixed switch terminal 80 through a resistor 82 in parallel with an inductance 84. Resistor 82 provides a $Z_0$ termination for the coaxial line between movable switch terminal 83 and coil 26', while the inductance 84 provides additional output drive at lower frequencies. An RC network comprised of resistor 87 in series with capacitor 86 compensates for inductive effects of transistors 72 and 78. The transistors 62 and 72 are preferably connected together by a heat sink or thermal connection, as are transistors 64 and 78, in order to avoid any cumulative effect of thermal differences in these transistors leading to erroneous large currents.

The amplifier comprising transistor 62 driving transistor 72 is a double emitter follower circuit providing a low impedance output at the emitter of transistor 72. The amplifier comprising transistors 64 and 78, driven from the same source, comprises a similar amplifier. The transistors are biased such that transistor 72 conducts substantially only for positive input signals applied at its base, while transistor 78 conducts substantially only for negative signals similarly applied. It will be appreciated that for substantially zero signal input from the collector transistor 60, substantially zero output voltage will then be applied to fixed switch terminal 80. However, if the signal at the collector of transistor 60 varies above and below ground, the mid-point between thermal stabilizing resistors 74 and 76, as well as switch terminal 80, will be driven correspondingly above and below ground.

Transistor 60 is driven in one direction by a current flowing in a first direction from the Hall plate through connections 46 and 48, and in the opposite direction for an oppositely directed current flowing from the Hall plate. Thus, the DC signal at switch terminal 80 will be above or below ground according to the direction of current flow from the Hall plate, and will attain a value according to the magnitude of the Hall plate current. Thus, the signal at a fixed switch terminal 80 is a measure of the direction and magnitude of the flux flowing in core 12'. Transistors 54, 56, 60, 62, 64, 72 and 78 may be considered a DC amplification means forming an extension of paraphase DC amplifier 50.

Fixed terminal 80 normally makes contact with movable terminal 83 operated by a switch control generally designated at 85, movable terminal 83 normally connecting fixed terminal 80 to one side of coil 26'. The opposite side of coil 26' is connected to movable switch terminal 88 also controlled by switch control 85 and normally making a connection with fixed terminal 90. The signal at fixed terminal 90 is applied to a probe amplifier 92 through a variable and calibrated attenuator 94. Amplifier 92 is a broad band amplifier and provides an output at 96.

The output at 96 is a combination of the Hall current as coupled to fixed switch terminal 80 through the preceding DC amplification means, and current resulting from voltage induced in coil 26'. It therefore includes low frequency components down to zero frequency as developed by Hall device 24', and higher frequency components as induced in coil 26'. Moreover, since the output at fixed switch terminal 80 is connected in series with coil 26', a current corresponding to the Hall current is passed through coil 26'. It is passed therethrough in a direction for opposing flux in the core 12' attributable to current in conductor 22'. Therefore, at low frequencies, the probe apparatus operates as a direct current transformer wherein the direct or low frequency currents in the coil 26' tend to oppose or cancel the flux giving rise to the same. And, the coil 26' itself operates at higher frequencies to provide a flux in opposition to the flux giving rise to higher frequency currents in coil 26'.

The bandwidth of amplifier 50 is adjustable and the gain of the circuit is also adjustable, by means of variable resistor 58, for adjusting the crossover between the lower frequency detection portion of the apparatus including the Hall device, and the higher frequency portion thereof comprising coil 26' alone. The bandwidth must be well over the $L/R$ time constant determined by the inductance of coil 26' and the resistive load provided, e.g., by attenuator 94. In this apparatus the higher and lower frequency portions of the measurement apparatus are substantially forced to cooperate and produce an output at 96 which is an accurate measure of the current in conductor 22' from high frequencies down to zero frequency, that is, including direct current components thereof. The output at 96 is suitably applied to an oscilloscope or other measuring device for registering or portraying the current in conductor 22'.

In a second position of switch control 85, movable terminal 83 connects to fixed terminal 98 and movable terminal 88 connects to fixed terminal 100. Terminals 98 and 100 are coupled to either side of a tuned circuit capacitor 102. This capacitor forms part of a feedback oscillator, additionally including cross coupled transistors 104 and 106. The base of transistor 104 is coupled to the collector of transistor 106 through the parallel combination of resistor 108, and the combination of capacitor 110 and resistor 112 in series. Similarly, the base of transistor 106 is coupled to the collector of transistor 104 through the parallel combination of resistor 114, and the combination of capacitor 116 and resistor 118 in series. Capacitor 102 joins the midpoint between capacitor 110 and resistor 112 to the midpoint between capacitor 116 and resistor 118.

The emitter of transistor 106 is connected to a negative voltage supply while the emitter of transistor 104 is connected by means of resistor 122 to normally open switch 120. The emitter is also bypassed to ground by means of capacitor 124. Switch 120 couples the oscillator circuit to fixed switch terminal 126 which in turn connects to movable terminal 128 when switch control 85 is placed in a downward or operating position. Movable terminal 128 normally connects to fixed terminal 130 coupled to the midpoint between resistor 132 and capacitor 134 disposed in series between a positive voltage and ground. Movable terminal 128 is connected to capacitor 138, the opposite side of which is grounded.

When switch control 85 is in its normal or upper position, fixed switch terminal 80 and coil 26' are connected in series to provide an input for attenuator 94 as hereinbefore described. However, when switch control 85 is thrown to a lower position, movable terminals 83 and 88 connect the coil 26' across capacitor 102 to complete a parallel tuned circuit for the oscillator. With switch control 85 in its upper position, capacitor 138 is charged to approximately a positive 16 volts through resistor 132. However, when switch control 85 is operated, movable terminal 128 connects capacitor 138 to fixed terminal 126 and, providing switch 120 is closed, current flows from capacitor 138 through transistors 104 and 106 and coil 26' so as to supply operating current to the oscillator for the time capacitor 138 is discharging. During this time, the cross-coupling of the oscillator circuit provides sufficient feedback to establish oscillation and a circulating current in the tuned circuit comprising coil 26' and capacitor 102, at the resonant frequency of the circuit. This frequency is desirably between 10 and 15 kilocycles per second. However, the amplitude of the oscillation will gradually decrease exponentially as capacitor 138 discharges. At first the circulating current in coil 26' is arranged to have sufficient amplitude for saturating core 12' first in one direction and then the other. Then, as the oscillations die out in damped fashion as indicated at 139, the residual magnetism of the core 12' is brought to substantially zero, thereby degaussing core 12'. It is understood that the degaussing operation will take but a short period of time and that degaussing control 85 may comprise a push button or the like which need be only momentarily depressed, depending upon the discharge time of capacitor 138. Suitably the circuit oscillates for approximately $\frac{1}{10}$ second.

The oscillator circuit desirably includes normally open switch 120. This switch is operated to its closed position by a cradle or holder for the probe 10' (not shown). The circuit will then only operate when the probe is placed in such cradle or holder and therefore the probe will not be connected to circuitry including a conductor 22' during the degaussing operation. Since appreciable current flows in coil 26' for the short degaussing period, this current might produce damaging currents in conductor 22' particularly if such conductor is associated with low level signal circuitry.

The circuit according to FIG. 2 also includes another movable terminal, 140, operated by switch control 85. In the lower operated position of movable terminal 140, this terminal makes connection with fixed terminal 142 which is maintained at a positive 16 volts. The switch acts to couple this positive voltage through resistor 144 to capacitor 146, the opposite terminal of which is connected to minus 16 volts. The capacitance of capacitor 146 may be substantial, e.g. a 47 microfarad capacitor was employed in one circuit according to the present invention. The junction between resistor 144 and capacitor 146 is also coupled to the base of transistor 66 by means of resistor 148, and the base is also returned to minus 16 volts through resistor 150. Small capacitor 152 returns the base to ground while diode 154 connects the emitter of transistor 66 to ground with the diode's anode being connected to the emitter.

The transistor 66 is normally nonconducting. When the degaussing switch control 85 is operated, transistor 66 starts conducting heavily because of the application of positive voltage to its base. This conduction effectively grounds the collector of transistor 60 through transistor 66 and diode 154 for positive voltage appearing at the collector of transistor 66, the negative voltages at the collector of transistor 66 being limited by heavy conduction through the collector to base junction of transistor 66 and through small valued resistors 144 and 148 to the +16 volt supply. Thus, a voltage near zero is insured at the fixed terminal 80. Then, when degaussing switch control 85 is released, transistor 66 turns off gradually as determined by the discharge of capacitor 146 through resistors 148 and 150 and through the base of transistor 66, meanwhile holding terminal 80 substantially at ground level. The purpose of this circuit is to prevent any surge of current into the coil 26' from the direct current amplification means leading from the Hall device when the switch terminals operated by switch control 85 return to normal position. Otherwise, an unwanted magnetizing flux might be inadvertently established in core 12'.

While we have shown and described several embodiments of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. A current probe for detecting a current in a conductor comprising:
   a magnetic core including a fixed portion and a movable portion for permitting the insertion of said conductor into linking relation with said core, said core having a winding thereon for providing a current indicative of an alternating component of flux produced by current in said conductor linking said core,
   means proximate said magnetic core for producing a current in response to at least substantially low frequency and direct components of flux produced by said conductor,
   means for coupling the current from said last mentioned means to said winding in a sense for producing a flux opposing low frequency and direct components of flux,
   means for measuring the combined current in an additive sense as provided by said winding indicative of an alternating component of flux, and as produced by said means proximate said core,
   and means for selectively completing a tuned circuit with said winding adapted to produce damped oscillations for degaussing said core.

2. The apparatus according to claim 1 wherein said means proximate said magnetic core comprises a Hall device including a Hall plate inserted across a cross-section of said core and having first connections for providing a current through said Hall plate and connections at orthogonal points on said Hall plate for providing an output current from said Hall device.

3. A device according to claim 1 wherein said means for selectively completing a tuned circuit comprises switching means for providing a circuit between said winding, said means for measuring, of said means proximate said core in a first position of the switching means, and for alternatively completing said tuned circuit with said winding in a second position of the switching means.

4. A current probe for detecting a current in a conductor comprising:
   a magnetic core including a fixed portion and a movable portion for permitting the insertion of said conductor into linking relation with said core, said core having a winding wound thereon and a Hall device disposed across a cross-section thereof,
   DC amplification means receiving the output of said Hall device and providing a current for application to said winding for producing a flux in said core opposing the flux produced by the current in said conductor,
   output means for receiving a value proportional to the current in said winding which is proportional to the additive combination of valtage induced in said winding causing a current flow therein and the output of the Hall device,
   and switching means for selectively decoupling said winding from said amplification means and from said output means, said switching means completing a tuned circuit with said winding adapted to produce oscillations for degaussing said magnetic core.

5. The apparatus according to claim 4 including an oscillator having a tuned circuit capacitance connected across said winding by said switching means.

6. The apparatus according to claim 5 further including a power supply for said oscillator comprising a capacitor normally charged to a predetermined value and wherein said switching means is effective to connect said capacitor in energizing relation with said oscillator causing said circuit to produce damped oscillations during the discharge of said power supply capacitor.

7. A current probe for determining the current in a conductor comprising:
   a core of magnetic material for linking said conductor,
   a coil wound on said magnetic core for providing a current indicative of an alternating component of flux produced by current in said conductor linking said core,
   said current in said coil producing a flux in said core tending to null the flux produced by said conductor,
   a Hall device including a Hall plate inserted across a cross section of said core to intercept the magnetic flux therein, said Hall plate producing a current indicative of flux in said core including a steady value thereof if any and low frequency alternating current components,
   means for amplifying the current from said Hall plate for application to said coil in a direction for opposing the flux produced by current in said conductor including a steady value thereof and low frequency alternating components thereof,
   means for meaning the combined current in an additive sense as induced in said coil and as provided from said Hall plate,
   and means for selectively providing a damped alternating current signal to said coil for degaussing said magnetic core while decoupling said coil from said amplifying means and said measuring means.

8. The apparatus according to claim 7 wherein said means for selectively providing a damped alternating current signal includes a feedback oscillator provided with a turned circuit capacitor and switching means for disconnecting said coil from said means for amplifying the current from said Hall plate and from said means for measuring the combined current in said coil in an additive sense, said switching means selectively connecting said coil across said turned circuit capacitor.

9. The apparatus according to claim 8 further including means for causing said amplifying means to produce a substantially zero output during operation of said switching means.

10. The apparatus according to claim 9 wherein said means for causing said amplifying means to produce a substantially zero output during operation of said switching means comprises further circuitry operated by said switching means for coupling a point in said amplifying means coupled to the output thereof substantially to a predetermined reference level when said coil is connected by said switching means across said tuned circuit capacitor, said further circuitry including time constant means for relatively slowly returning said point in said amplifying means to a normal operating level when said switching means returns said coil to said amplifying means and to said means for measuring the combined current.

11. The apparatus according to claim 8 wherein said feedback oscillator comprises first and second cross-coupled transistors each disposed in driving relation to said turned circuit capacitor, and a power supply capacitor for said oscillator circuit normally provided with a charge, said power supply capacitor being connected to said oscillator by operation of said switching means causing the tuned circuit including said tuned circuit capacitor and said coil to provide damped oscillations for degaussing said magnetic core.

References Cited

UNITED STATES PATENTS

| | | | |
|---|---|---|---|
| 2,928,048 | 3/1960 | Postal | 324—117 XR |
| 2,962,621 | 11/1960 | Fernald | 317—157.5 XR |
| 2,959,722 | 11/1960 | Gilinson | 317—157.5 XR |
| 3,093,774 | 6/1963 | Christianson et al. | 317—157.5 |
| 3,249,795 | 5/1966 | Dietch | 317—157.5 XR |
| 3,274,452 | 9/1966 | Landes | 317—157.5 |

RUDOLPH V. ROLINEC, Primary Examiner

ERNEST F. KARLSEN, Assistant Examiner

U.S. Cl. X.R.

317—157.5; 324—45

PO-1050
(5/69)

UNITED STATES PATENT OFFICE
CERTIFICATE OF CORRECTION

Patent No. 3,482,163   Dated Dec. 2, 1969

Inventor(s) WILLIAM HENDERSON PEEK and ELDON LEE HOVEN

It is certified that error appears in the above-identified patent and that said Letters Patent are hereby corrected as shown below:

Column 2, line 71, "in" should be --In--.

Column 4, line 7, "Provided" should be --provide--.

Column 7, line 32, Claim 1, line 15: after "opposing" and before "low", insert· --the--;

line 51, Claim 3, line 4: "of" should be --and--;

line 69, Claim 4, line 15: "valtage" should be --voltage--.

Column 8, line 33, Claim 7, line 21: "meaning should be --measuring-- , and "current" should be --currents-- .

line 48, Claim 8, line 9: "turned" should be --tuned--;

line 69, Claim 11, line 4: "turned" should be --tuned--.

SIGNED AND
SEALED
JUN 9 1970

(SEAL)
Attest:

Edward M. Fletcher, Jr.
Attesting Officer

WILLIAM E. SCHUYLER, JR.
Commissioner of Patents